US006829603B1

(12) United States Patent
Chai et al.

(10) Patent No.: US 6,829,603 B1
(45) Date of Patent: Dec. 7, 2004

(54) SYSTEM, METHOD AND PROGRAM PRODUCT FOR INTERACTIVE NATURAL DIALOG

(75) Inventors: Joyce Yue Chai, Elmsford, NY (US); Sunil Subramanyam Govindappa, Pleasantville, NY (US); Nandakishore Kambhatla, Elmsford, NY (US); Tetsunosuke Fujisaki, Armonk, NY (US); Catherine G. Wolf, Katonah, NY (US); Dragomir Radkov Radev, Ann Arbor, MI (US); Yiming Ye, White Plains, NY (US); Wlodek Zadrozny, Tarrytown, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/496,615

(22) Filed: Feb. 2, 2000

(51) Int. Cl.[7] .............................................. G06F 17/30
(52) U.S. Cl. ................................ 707/5; 707/10; 704/9
(58) Field of Search ............................. 707/5, 3, 4, 10, 707/104.1; 705/26; 704/9

(56) References Cited

U.S. PATENT DOCUMENTS

| | | | |
|---|---|---|---|
| 5,426,781 A | | 6/1995 | Kaplan et al. .................. 707/4 |
| 5,574,908 A | | 11/1996 | Harding et al. ................. 707/1 |
| 5,737,592 A | | 4/1998 | Nguyen et al. ................ 707/4 |
| 5,748,974 A | * | 5/1998 | Johnson .......................... 704/9 |
| 5,784,562 A | * | 7/1998 | Diener ....................... 709/217 |
| 6,094,652 A | * | 7/2000 | Faisal ............................. 707/5 |
| 6,173,279 B1 | * | 1/2001 | Levin et al. .................... 707/5 |
| 6,182,063 B1 | * | 1/2001 | Woods ............................ 707/3 |
| 6,233,561 B1 | * | 5/2001 | Junqua et al. ............... 704/277 |
| 6,246,997 B1 | * | 6/2001 | Cybul et al. .................. 705/27 |
| 6,282,534 B1 | * | 8/2001 | Vora ................................ 707/3 |
| 6,314,420 B1 | * | 11/2001 | Lang et al. ..................... 707/3 |
| 6,324,513 B1 | * | 11/2001 | Nagai et al. ................ 704/275 |
| 6,346,952 B1 | * | 2/2002 | Shtivelman .................. 345/758 |
| 6,377,913 B1 | * | 4/2002 | Coffman et al. ................ 704/8 |
| 6,430,531 B1 | * | 8/2002 | Polish ......................... 704/257 |
| 6,604,141 B1 | * | 8/2003 | Ventura ....................... 709/227 |
| 6,625,595 B1 | * | 9/2003 | Anderson et al. ............... 707/3 |

OTHER PUBLICATIONS

Charles Rich et al., "Collagen: A Collaboration Manager for Software Interface Agents," Mitsubishi Electric Information Technology Center America, Mar. 1998, pp. 1–36.

Ion Androutsopoulos et al., "Time, Tense and Aspect in Natural Language Database Interfaces," pp. 1–61.

(List continued on next page.)

*Primary Examiner*—Greta Robinson
(74) *Attorney, Agent, or Firm*—Law Office of Charles W. Peterson, Jr.; Louis J. Percello

(57) ABSTRACT

This patent describes a novel system, method, and program product that are used in interactive natural language dialog. One or more presentation managers operating on a computer system present information from the computer system to one or more users over network interface(s) and accept queries from the users using one or more known input/output modalities (e.g. Speech, typed in text, pointing devices, etc.). A natural language parser parses one or more natural language phrases received over one or more of the network interfaces by one or more of the presentation managers into one or more logical forms (parsed user input), each logical form having a grammatical and structural organization. A dialog manager module maintains and directs interactive sessions between each of the users and the computer system. The dialog manager receives logical forms from one or more of the presentation managers and sends these to a taxonomical mapping process which matches the items of interest to the user against the content organization in the content database to match business categories and sends modified logical forms back to the dialog manager.

29 Claims, 18 Drawing Sheets

OTHER PUBLICATIONS

I. Androutsopoulos et al., "Natural Language Interfaces to Databases—An Introduction," Cambridge University Press, 1995, pp. 29–81.

IBM Electronic Commerce, "IBM Net.Commerce Solutions for e–business," Dec. 1997, pp. 1–7.

Samantha Shurety, "IBM e–business with Net.Commerce," (book) Prentice Hall, 1999, pp. 1–718.

Http://macys.com, 1 page.

Dragomir R. Radev, "Generating Natural Language Summaries from Multiple On–Line Sources: Language Reuse and Regeneration," Columbia University, 1999, pp. 1–209.

* cited by examiner

```
<PRESENTATION_REQUEST>
<CLARIFICATION_REQUEST CURRENT_ACTION="INFO">
    <CURRENT_PARAMETERS>
        <PRODUCT GENDER="man" SPECIFIED_BY="user">shirt</shirt></PRODUCT>
    </CURRENT_PARAMETERS>
    <CURRENT_CHOICES>
        <CHOICE>long sleeves</CHOICE>
        <CHOICE>short sleeves</CHOICE>
        <CHOICE>featured Polo shirt</CHOICE>
        <CHOICE>100\% Cotton shirts</CHOICE>
        <NONE_OF_ABOVE>if these items are not what you are looking for, please clarity your question or ask a new question</NONE_OF_ABOVE>
    </CURRENT_CHOICES>
</CLARIFICATION_REQUEST>
<PRESENTATION_REQUEST>
```

FIG.2a

```
<PRESENTATION_REQUEST>
<QUERY_RESULTS CURRENT_ACTION="INFO">
    <CURRENT_PARAMETERS>
        <PRODUCT GENDER="man" SPECIFIED_BY="user">shirt</PRODUCT>
        <PRODUCT_TYPE>long sleeves</PRODUCT_TYPE>
    </CURRENT_PARAMETERS>
    <RESULTS>
        <RESULT><PRODUCT>Product 1</PRODUCT></CHOICE>
        <RESULT><PRODUCT>Product 2</PRODUCT></CHOICE>
        <RESULT><PRODUCT>Product 3</PRODUCT></CHOICE>
        <RESULT><PRODUCT>Product 4</PRODUCT></CHOICE>
        <NONE_OF_ABOVE>if these items are not what you are looking for, please clarify your question or ask a new question</NONE_OF_ABOVE>
    </RESULTS>
</QUERY_RESULTS>
<PRESENTATION_REQUEST>
```

FIG.2b

| INDEX | CONTENT |
|---|---|
| 0 | PRODUCT |
| 01 | CLOTHING |
| 02 | JEWELRY |
| 011 | MEN |
| 012 | WOMEN |
| 013 | KIDS |
| 021 | RINGS |
| 022 | NECKTIES |
| 023 | WATCH |
| 0111 | PANTS |
| 0112 | T-SHIRTS |
| 0112 | SUITS |
| 0114 | HATS |
| 0121 | PANTS |
| 0122 | KHAKIS |
| 0123 | SKIRTS |
| 0131 | JEANS |
| 0132 | HATS |

355
270

| INDEX | CONTENT |
|---|---|
| 0 | PRODUCT |
| 01 | ACCESSORIES |
| 02 | WORKSTATION |
| 03 | PERSONAL COMPUTER |
| 011 | MONITORS |
| 012 | KEYBOARD |
| 021 | SYSTEM 8000 |
| 031 | APTIVA |
| 032 | ThinkPad |
| 0321 | ThinkPad 770 |
| 0322 | ThinkPad 600 |
| 0323 | ThinkPad 570 |
| 0324 | ThinkPad 390 |

| 415 | |
|---|---|
| SISTER | WOMAN |
| GIRLFRIEND | WOMAN |
| WIFE | WOMAN |
| TROUSERS | PANTS |

| 417 | |
|---|---|
| CHEAP LAPTOP | ThinkPad 390 |
| EASILY CARRIED | ThinkPad |
| SISTER IN JUNIOR HIGH | NONPROFESSIONAL |
| WAITRESS IN HOTEL | NONPROFESSIONAL |

I WANT TO BUY TROUSERS FOR MY GIRLFRIEND

212

((ACTION BUY) (PRODUCT CLOTHING)
(CATEGORY TROUSERS)
(BenefitPerson GIRLFRIEND)))

| INDEX | CONTENT |
|---|---|
| 0 | [BUY] |
| 01 | [PRODUCT] |
| 02 | [CATEGORY] |
| 03 | [BENEFIT PERSON] |
| 011 | CLOTHING |
| 021 | TROUSERS |
| 031 | GIRLFRIEND |

500

I WANT TO BUY A SMALL COMPUTER THAT CAN BE EASILY CARRIED FOR MY SISTER IN JUNIOR HIGH ((ACTION BUY) (PRODUCT COMPUTER)
(PROPERTY EASILY CARRIED)
(BenefitPerson SISTER IN JUNIOR HIGH)))

| INDEX | CONTENT |
|---|---|
| 0 | [BUY] |
| 01 | [PRODUCT] |
| 02 | [CATEGORY] |
| 03 | [BENEFIT PERSON] |
| 011 | COMPUTER |
| 021 | EASILY CARRIED |
| 031 | SISTER IN JUNIOR HIGH |

| INDEX | CONTENT |
|---|---|
| 0 | [BUY] |
| 01 | [PRODUCT] |
| 02 | [CATEGORY] |
| 03 | [BENEFIT PERSON] |
| 011 | CLOTHING |
| 021 | PANTS |
| 031 | WOMEN |

501

| INDEX | CONTENT |
|---|---|
| 0 | [BUY] |
| 01 | [PRODUCT] |
| 02 | [CATEGORY] |
| 03 | [BENEFIT PERSON] |
| 011 | COMPUTER |
| 021 | ThinkPad |
| 031 | NONPROFESSIONAL |

TRANSACTION: buy
TEMPLATE PARAMETERS:
item name:
sku:
quantity:
size:
color:
Company:
REQUIRED PARAMETERS: item name, quantity, model

FIG.8

I'm looking for: [    ]

(example: a blue striped shirt)

[Clear] [Submit]

FIG.9a

WHAT KING OF SHIRTS ARE YOU LOOKING FOR:

- Long Sleeves
- Short Sleeves
- Polo Shirt
- 100% Cotton

IF NONE OF THE ABOVE DESCRIBES YOUR NEED, PLEASE TYPE IN YOUR REQUEST:

[Clear] [Submit]

FIG.9b

WE HAVE FOUND THE FOLLOWING PRODUCTS FOR YOU:

Product 1
    Product 2
    Product 3
    Product 4

IF YOU CHANGE YOUR MIND OR LOOK FOR MORE PRODUCTS, PLEASE TYPE IN YOUR REQUEST:

[ Clear ]    [ Submit ]

FIG.9c

SYSTEM, METHOD AND PROGRAM PRODUCT FOR INTERACTIVE NATURAL DIALOG

FIELD OF THE INVENTION

This invention relates to database searching and queries, and more particularly to natural language based interactive database searching and queries in network environment.

BACKGROUND OF THE INVENTION

Databases and database search techniques are very well known in the computer arts. Databases have various structures and include any given type of information. In many cases some or all of this information is retrieved by using one or more queries. A query is a request for information from the database that has a structure compatible with the database. Generally, the query is processed in a search that returns results to user.

One common technique for natural language access to databases is to convert natural language sentences to SQL statements. Some examples of SQL statements are shown below:
Query: Show me the names and batting averages of all players who batted above 0.250.
SELECT
  Name, Average
FROM
  Player
WHERE
  Average>0.250
Query: Show me the names and batting averages of all Oriole, Red Sox, and Expo players who batted above 0.300.
SELECT
  Player.Name, Average
FROM
  Player,Team
WHERE
  Average>0.300
AND
  Player.Team=Team.Team
AND
  Team.Name IN ('Orioles', 'Red Sox', 'Expos')
Query: Show me the sum of all batting averages of all players except these from the White Sox and Diamondbacks.
SELECT
  SUM(Average)
FROM
  Player,Team
WHERE
  Player.Team=Team.Team
AND
  Team.Name
NOT IN
  ('White Sox','Diamondbacks')

A paper titled "Natural Language interfaces to databases—an introduction" by I. Androutsopoulos and G. D. Ritchie, appeared in Natural Language Engineering 1(1): 29–81; 1995 Cambridge University Press, which is herein incorporated by reference in its entirety, presents a history of natural language access to databases and provides a survey of the most significant problems that a program that provides such access must face. State-of-the-art database searching includes interactive search, natural language queries and search via internet. One non-natural language interactive database searching technique is described in U.S. Pat. No. 5,426,781 entitled "Computerized report-based interactive database query interface" that discloses a method and system for interactively and iteratively constructing a query using a table metaphor displayed on a user display. Alterations are made directly to the table metaphor by the database user. The alterations relate to adding, deleting, or combining columns of attributes and limiting ranges of attribute values. The alterations are registered and the table metaphor updated to reflect the registered alterations. The table metaphor can be repeatedly used to further register additional alterations. The query corresponding to the table metaphor in its final form is run against the full database to generate a report in the format indicated by the table metaphor.

Using natural language queries to access the information system is also well known. U.S. Pat. No. 5,574,908 entitled "Method and apparatus for generating a query to an information system specified using natural language-like constructs" (herein incorporated by reference in its entirety) discloses an apparatus for generating a query to an information system using a drag-and-drop information system specification means utilizing a computer language having both textual and graphical forms for translating natural language-like constructs into object-role modeling symbology.

Doing database searching over a general network, e.g. the internet, an intranet, etc. is also well known. In this type of database searching, one or more clients generate a query that is transmitted over the network, a process running on a search processes the query against one or more databases, and returns result to the client back over the network.

U.S. Pat. No. 5,737,592 entitled "Accessing a relational database over the Internet using macro language files" (herein incorporated by reference in its entirety) discloses a method for executing Structured Query Language (SQL) queries in a computer-implemented relational database management system via a network.

One popular way of searching over a network (Internet) is to use a search engine. Most search engines are keyword based search such as YAHOO (http://www.yahoo.com), LYCOS (http://www.lycos.com) etc., where no user interaction is supported. The user is asked to input the keywords that best represent their interests, then the search engine will look for those keywords (and possibly the synonyms of those keywords) against the document collections. Where a match is found in the document, that document will be retrieved and presented to the user. A typical user is forced to manually go through the many "matches" for a query and find the relevant information herself.

Similar procedures are in place for searching for products. The customers either have to go through a possibly long series of clicking the hyperlinks, or use one of the search mechanisms described above.

Recently, some websites (www.AskJeeves.com, www.Neuromedia.com) have started search operations on question-answer mode. Natural language search engines, such as AskJeeves, use a relatively simple technical approach of keywords, and templates to give the user a feeling of a "natural language interface". For example, a query "What is the capital of Kenya?" returns a pointer to several Web sites including one about Kenya where the correct answer is included in the text. However, a question "How long does it take to fly from London to Paris on the Concorde?" produces a set of similar questions to the one asked however none of them is related to the answer— example: "Where can I find cheap flights from the UK?". The method used to produce answers seems to consist of a 5-steps: (a) partly parse the query; (b) map to a canned set of questions/question-templates; (c) map canned questions go to existing knowledge bases (AskJeeves points to other people's web sites for the real data/FAQs.); (d) do a meta search on the 5 big search engines (and return their results too); and (e) if there was no match in "b" then record the query for later human analysis. Note that "b" is essentially a person-intensive task-creating the list of key phrases and the canned questions they map to (and then the underlying web pages they map to). Such systems provide a reasonable front end to a large knowledge base/FAQ. They are better than a raw search engine, because they have the human touch of mapping phrases to canned questions/templates (backed up with the search engines).

Other sites, such as Neuromedia (www.neuromedia.com), BigScience(www.bigscience.com), Novator (www.novator.com), PersonalLogic (www.personallogic.com) try to offer more interactivity to the user. By interactivity we mean the capability of a system to jointly define parameters required for mutual understanding in a series of exchanges. These might be some action parameters, such as Amount, Account_to, Account_from for transferring money, or a set of preferences for a computer notebook. These parameters may be established either by user providing information to the system or the system suggesting some or all of them. What is important is that the system remembers current (and possibly previous) user's preferences, and is using this information in an intelligent manner to make the interaction more satisfying for the user. The above sites, offer more interactivity, by extending the question answer mode of operation with contextual history in the interaction.

PROBLEMS WITH PRIOR ART

The prior art systems fail primarily in three areas:

1. Efficiency: many rounds of interaction are needed to accomplish a task. A typical buying request on average takes about 20 mouse clicks.

2. Lack of deeper understanding of queries. Natural language engines such as AskJeeves cannot be used to accomplish transactions, such as buying clothes, because: (a) a keyword search cannot understand that "summer dress" should be looked upon in women's clothing dept. under "dresses" and "dress shirt" most likely in men's under "shirts", and (b) a search for "shirt" can reveal dozens or even hundred items, which is useless for somebody who has a specific style and pattern in mind. In order to have an appropriate answer, a dialogue with the user is required: the system must come back with questions, e.g., about style, color, etc.

3. Search engines do not accommodate business rules, e.g. a prohibition against displaying heap earrings with more expensive ones.

Search engines, such as AskJeeves, do not engage in dialog with the user, rather they respond to a single question with a set of possible answers. While these search engines are appropriate for searches and can be used in self service in many cases (e.g. For finding general information about the offerings of a bank), in order to have an exact answer—a dialog with the user is required and not sufficient in these systems. For example, to search for a "shirt", sometimes, the user is aware of the specific style and can specify his/her exact interest right at the beginning in a sentence or two; sometimes, the user fails to input the crucial information for the specific style even if he/she has that in mind, sometimes, the user needs help to formulate his/her specific interest. Without dialog with the user to find out his/her exact intention and interest, the search result can reveal dozens or even hundreds of items which could be overwhelming and useless to the user.

For instance, trying to find a pair of black pants without cuffs might take over 10 minutes of exploration of a typical site (such as www.macys.com) because not all pants are available in blacks, some have cuffs and some do not, and also because it is not clear whether the search should be done under "career", "casual" or "active", if the pair in mind is "business casual".

Novator(www.novator.com), PersonalLogic (www.personallogic.com) try to offer more interactivity to the user, for instance in buying a computer a program could ask a number of questions to help with the configuration and pricing. However, the interaction is still unnatural and often time consuming for a casual user, because often it requires spending a lot of time either inputting information or browsing without any feedback from the system about getting closer to the user's goal. Also, the user is required to use and understand the terminology of the site.

OBJECTS OF THE INVENTION

An object of this invention is an improved system, method, and program product for searching computer network sites.

An object of this invention is an improved system, method, and program product for searching computer network sites with fewer user requests to find a proper response to one or more queries.

An object of this invention is an improved system, method, and program product embodying a natural language dialog system that better analyzes and understands queries.

An object of this invention is an improved system, method, and program product embodying a natural language dialog system that allows for a dialog with a user.

An object of this invention is an improved system, method, and program product for searching computer network sites while accommodating domain rules, e.g. business rules.

SUMMARY OF THE INVENTION

This invention is a computer system, method, and program product that has a content database stored on one or more of its memories. The content database has a content organization that may or may not be part of the database. One or more presentation manager modules present information from the computer system to one or more users over one or more network interfaces and accept queries from one or more of the users using one or more known input/output modalities (e.g. Speech, typed in text, pointing devices, etc.). A natural language parser parses one or more natural language phrases received over one or more of the network interfaces by one or more of the presentation managers into one or more logical forms (parsed user input), each logical form having a grammatical and structural organization. A dialog manager module maintains and directs interactive sessions between each of the users and the computer system. The dialog manager receives logical forms from one or more of the presentation managers and sends these to a taxonomical mapping process which matches the items of interest to the user against the content organization in the content database to match business categories and sends modified logical forms back to the dialog manager. In a preferred embodiment, these modified logical forms are matched against a set of predefined action templates, the best matching template is selected, corresponding action requests are sent to an action manager, action results are received from the action manager, and presentation requests are sent to one or more of the presentation managers for presenting the system response to the user. The action manager module receives action requests from the dialog manager, executes the action (e.g. Retrieving the latest price of a stock or all blue pants with cuffs), and sends the action results to the dialog manager.

BRIEF DESCRIPTION OF THE FIGS.

The foregoing and other objects, aspects, and advantages will be better understood from the following non limiting detailed description of preferred embodiments of the invention with reference to the drawings that include the following:

Figure 2:
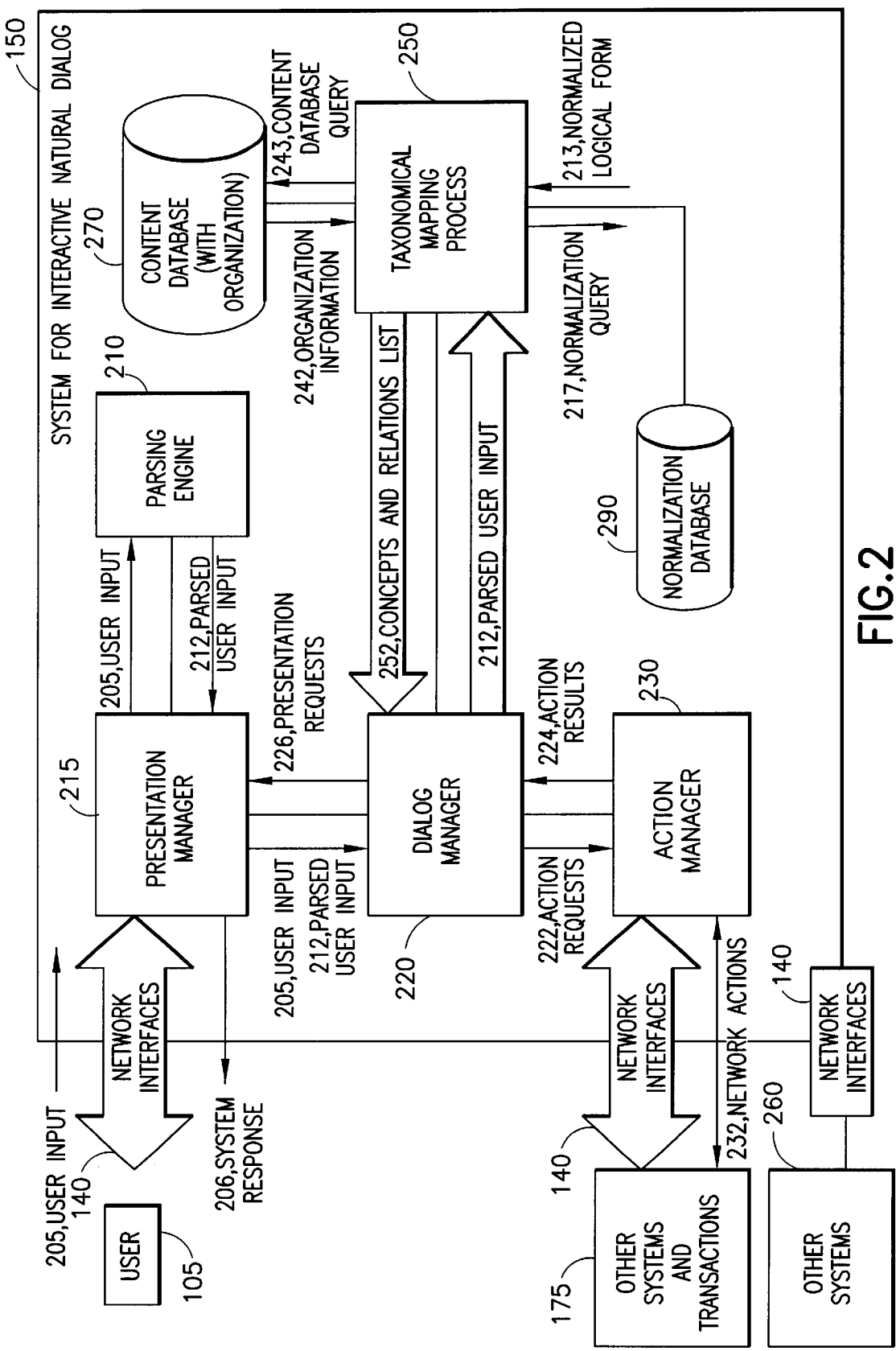
FIG. 2 shows a high level block diagram of the system architecture of one preferred embodiment of the invention.
Figure 2A:
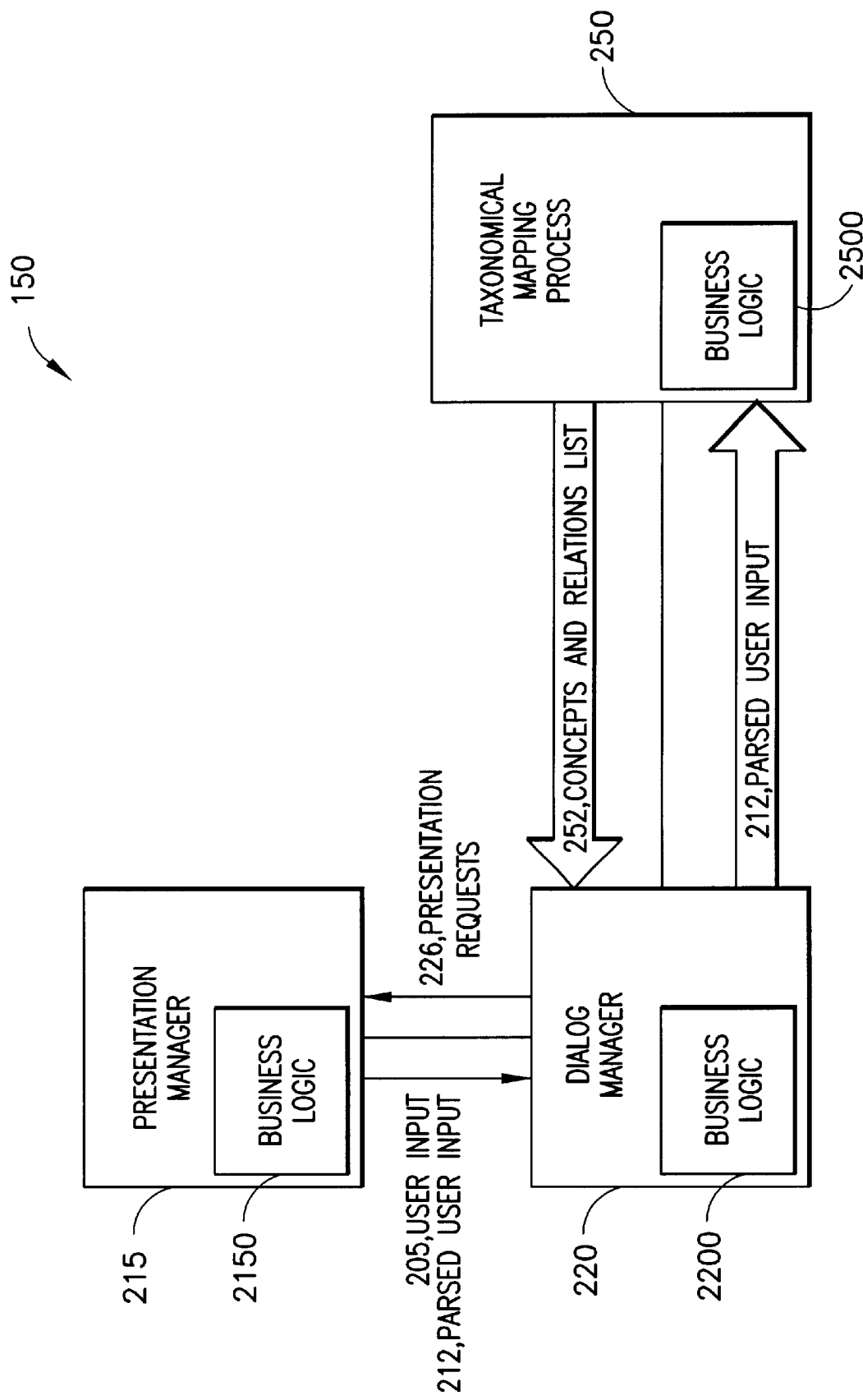

FIG. 2AA is a block diagram showing various locations for business rules and/or logic.

FIG. 2(a) shows an example of a presentation request for generating a clarification screen shown in FIG. 9(b).

FIG. 2(b) shows an example of a presentation request for generating a results screen shown in FIG. 9(c).

FIG. 3 shows examples of two tables in the content database.

FIG. 4 shows examples of two tables in the normalization database.

Figure 5A:
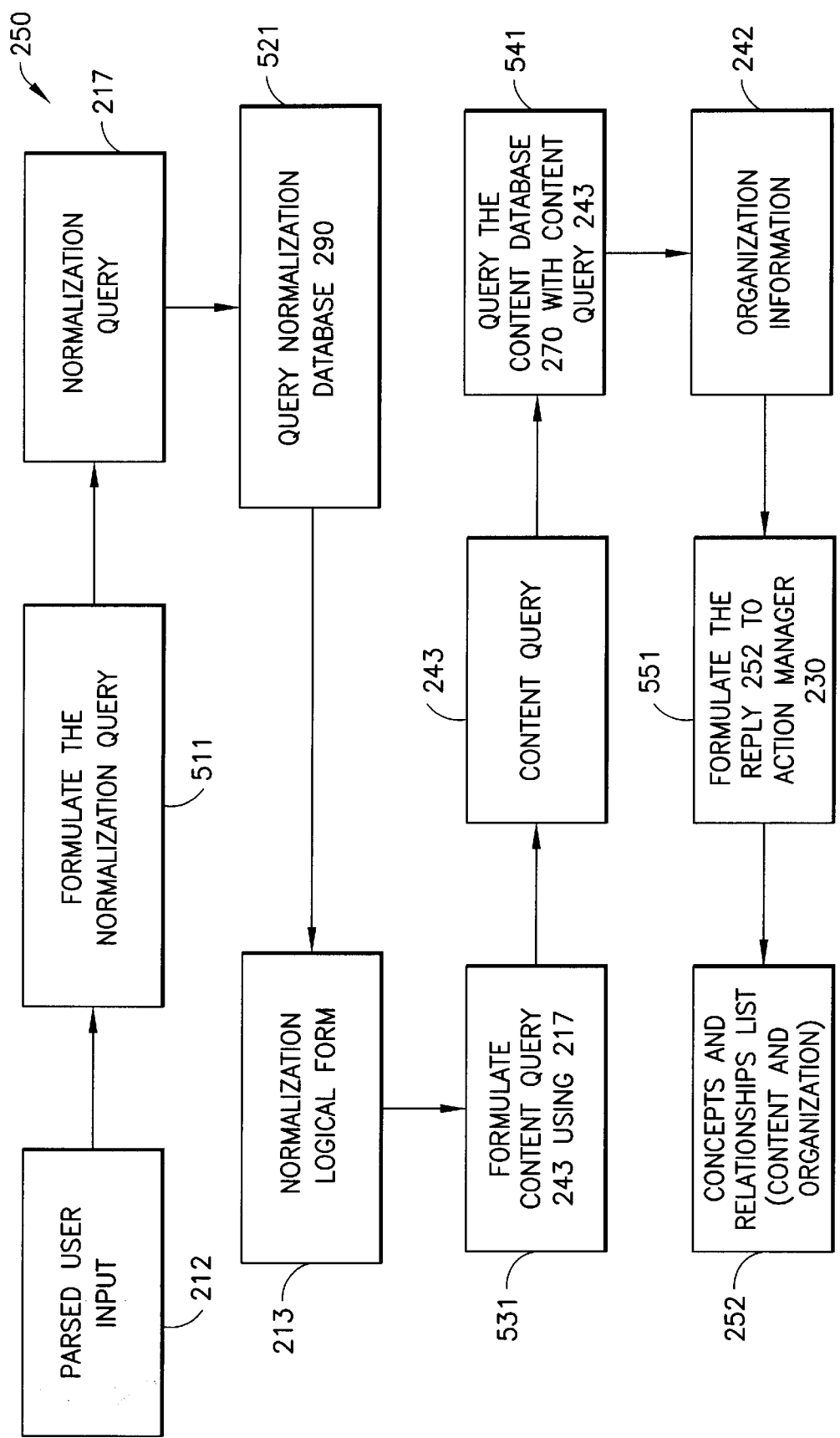

FIG. 5(a) shows a flowchart of the control flow of the taxonomical mapping process.

FIG. 5(b) shows two examples of tabular representations of the parsed user input (logical form).

FIG. 5(c) shows two examples of the normalized logical form.

Figure 6:
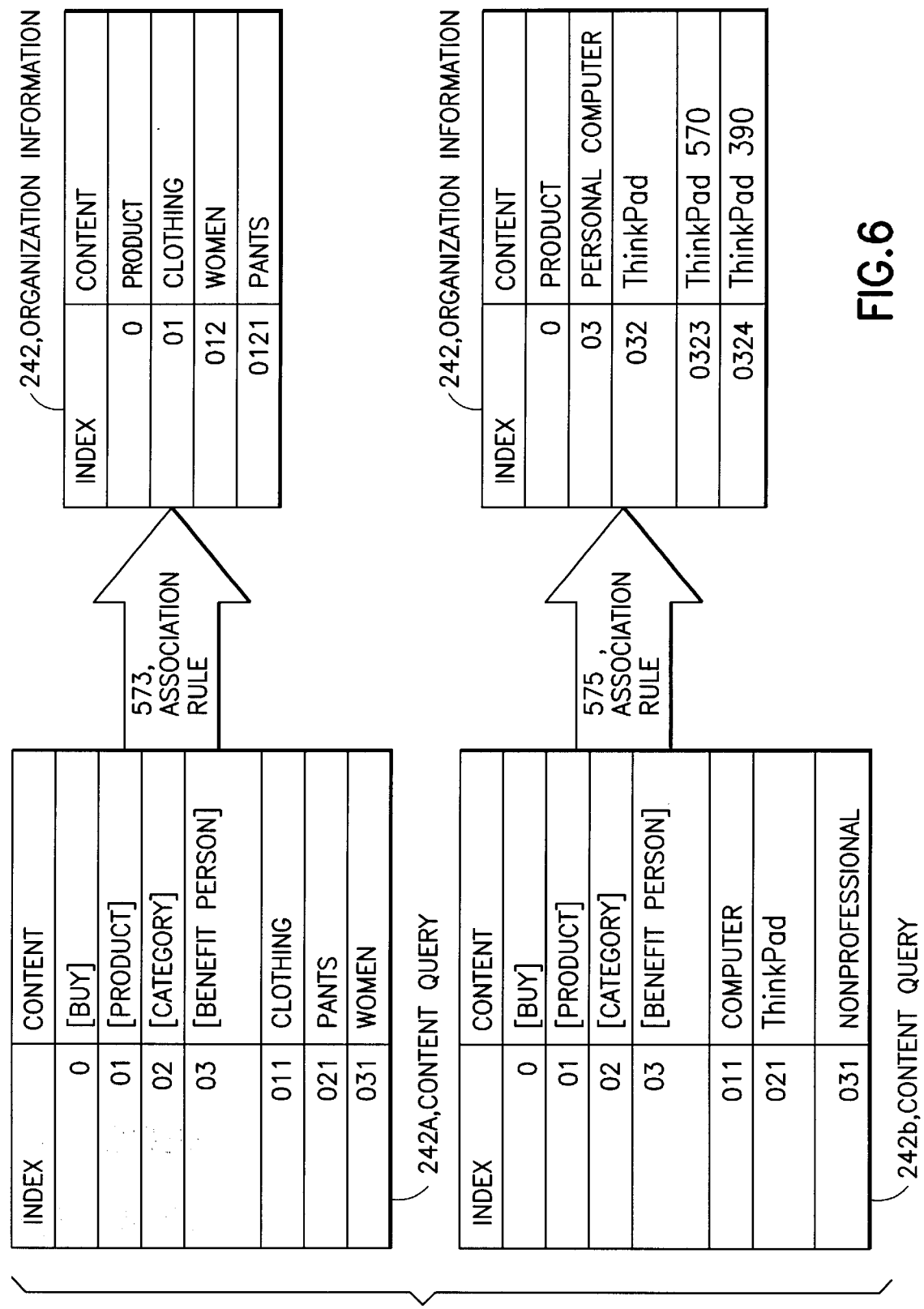

FIG. 6 shows two examples of querying the content database with a content query in the taxonomical mapping process (shown in FIG. 5(a)).

Figure 7:
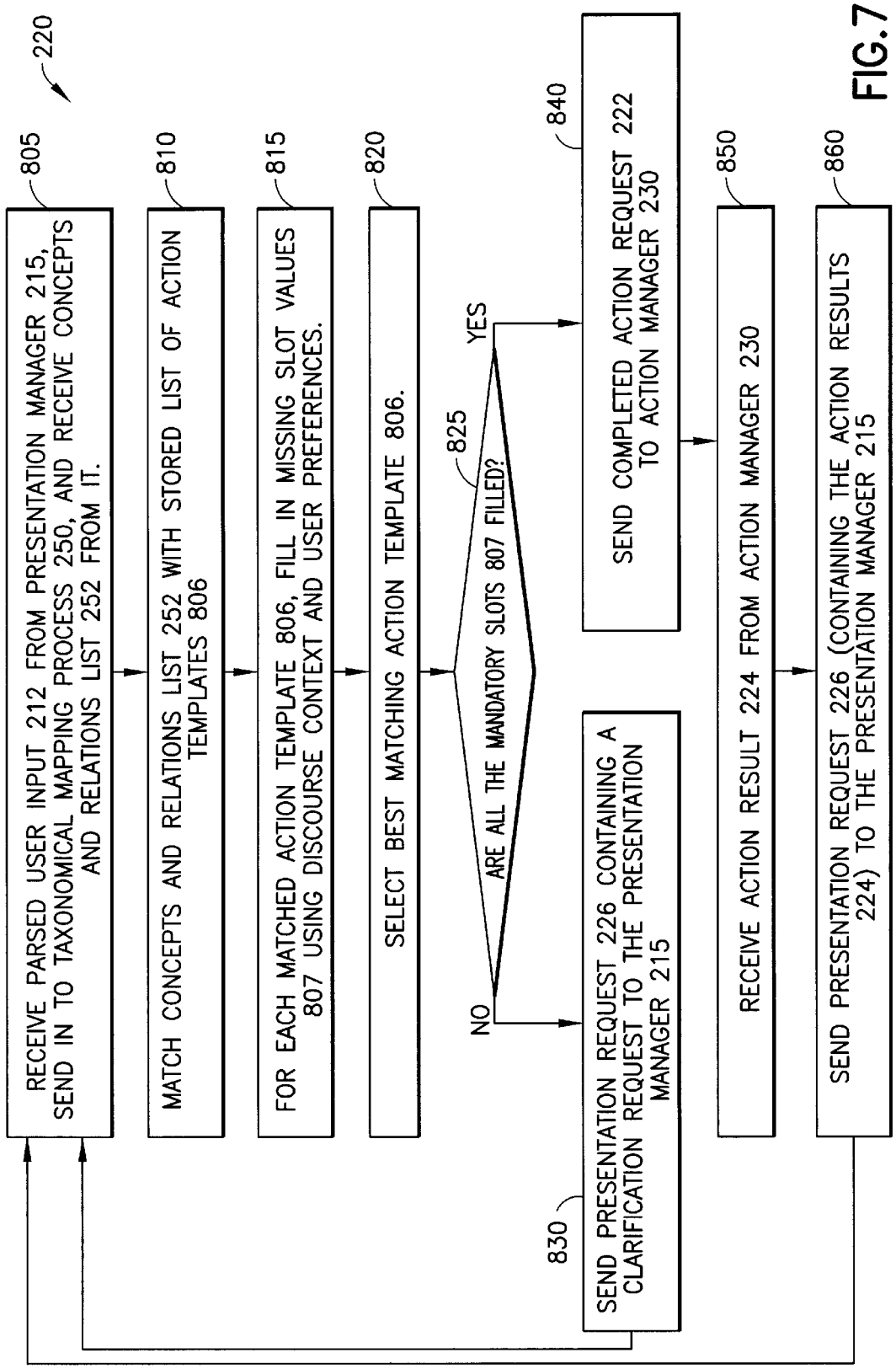

FIG. 7 is a flowchart of the control flow of the dialog manager.

FIG. 8 shows an example of an action template for a retail 'buy' transaction.

Figure 9:
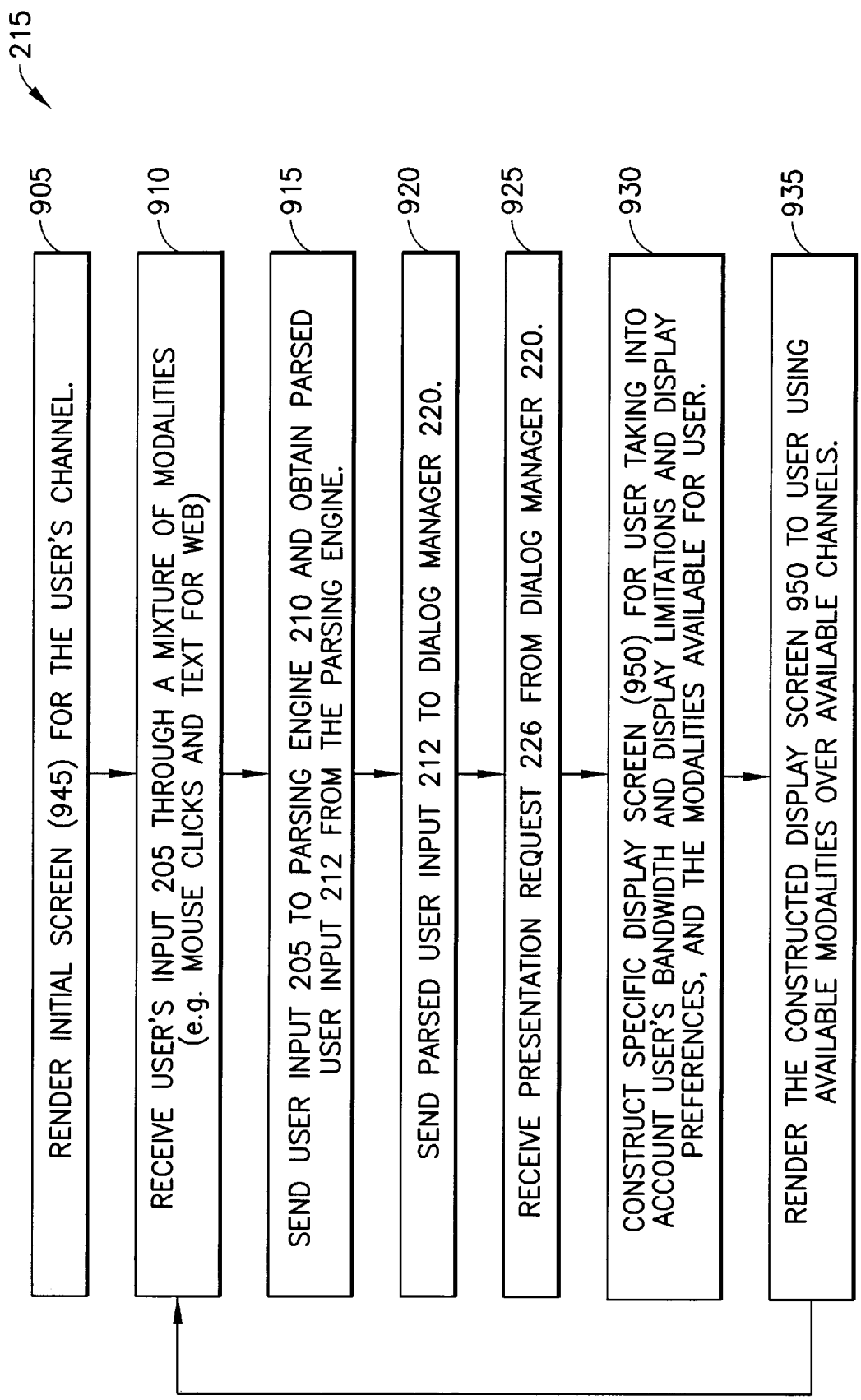

FIG. 9 is a flowchart of the control flow of the presentation manager.

FIG. 9(a) shows an example of an initial screen generated by the presentation manager for a web channel.

FIG. 9(b) shows an example of a display screen for a clarification dialog generated by the presentation manager for a web channel.

FIG. 9(c) shows an example of a display screen for a results display generated by the presentation manager for a web channel.

Figure 10:
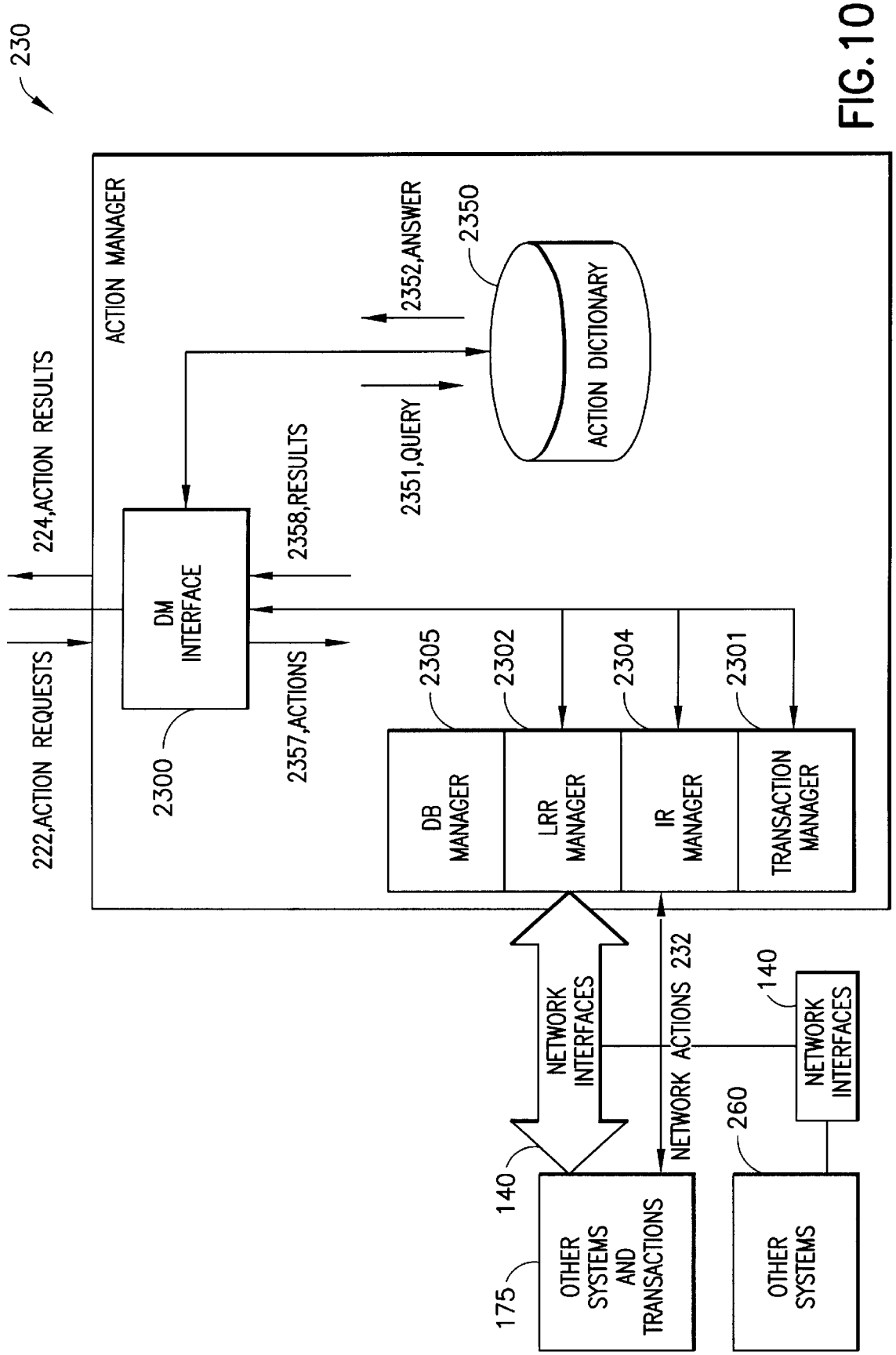

FIG. 10 is a block diagram of the data flow for the action manager.

DETAILED DESCRIPTION OF THE INVENTION

The present invention improves dialog interaction between the user and the computer in the domain database query formulation and refinement. More specifically, it shows how to construct efficient and effective systems for querying and transactions based on a mapping, or mappings, between the commonsense domain organization and the business organization of data in the said domain.

Another purpose of this invention is to improve interactions of users with networked computers in the domain of electronic commerce and for the internet.

Dialog is one of the most natural ways of interaction with the user. Some interactions with the user involve the user defining SQL language or filling tables or using tools. Typically, these interactions either require advanced skills and therefore exclude the novice users from effective interactions, or are very highly structured, typically based on the business structure of the domain, and therefore precluding fast and efficient interactions. By carrying natural language dialog with the user, generating the language that both skilled and novice users can understand and respond to, a system based on this invention can be used by a wide variety of people.

The present invention is a system and method for carrying such dialogs. Given a domain and a database, we show how to build a system that would allow a user or users to conduct queries and transactions by creating a taxonomical mapping process that associates the grammatical and structural organization of the domain with the content organization of the data. The purpose of the taxonomical mapping is to provide a mapping from conceptual structures of the user— expressed in natural language or a combination of natural language and other media (e.g. pointing, or other sensory data)—into the business organization of the data. And, vice versa, the mapping allows the system to present the business organization using the conceptual structures of the user.

This process addresses the shortcomings of the prior art as follows:

Since natural language allows the user to directly express his/hers intention, instead of navigating the business organization of the database, the invention makes the process more efficient. The capability to express the desire in language reduces the cognitive effort on the part of the user; the fact that it is accomplished through interaction and not just a single query makes the process effective. It is possible to directly map the user request into the most closely related set of items/categories in the database. This is accomplished in one or a few interactions (a dialog), as opposed to 20 or more mouse clicks involving interaction with the server. The efficiency of natural language as an expressive medium has been confirmed in Wizard of Oz experiments. (See e.g. T. K. Landauer "The trouble with computers", MIT Press 1995 pp.282–283.)

The mapping is concerned with relating user's categories with business categories, which cannot be accomplished by keyword search. For example, 'dress' in 'dress shirt' is a modifier and in 'summer dress' is a category. Keyword searches, by definition, cannot distinguish between the two cases, since they only look for words, e.g. dress, without taking into account the category information, which is derived from the grammatical and structural organization of the query.

The problem of dealing with business categories is also addressed by taxonomical mapping, and cannot be solved by prior art. That's because natural language and business categories do not necessarily coincide. For example, the natural language category "earrings" can correspond to two business categories "plastic earrrings" and "gold and platinum earrings". Similarly, multiple natural categories, e.g.

"frogs", "tofu", and "vegetables" can correspond to one business category "vegetarian dishes". Thus having a mapping between the natural language (i.e., grammatical, structural, and semantical) and business organization is essential in addressing the third problem (i.e. that search engines do not accommodate business rules, e.g. a prohibition against displaying cheap earring with more expensive ones).

Figure 1:
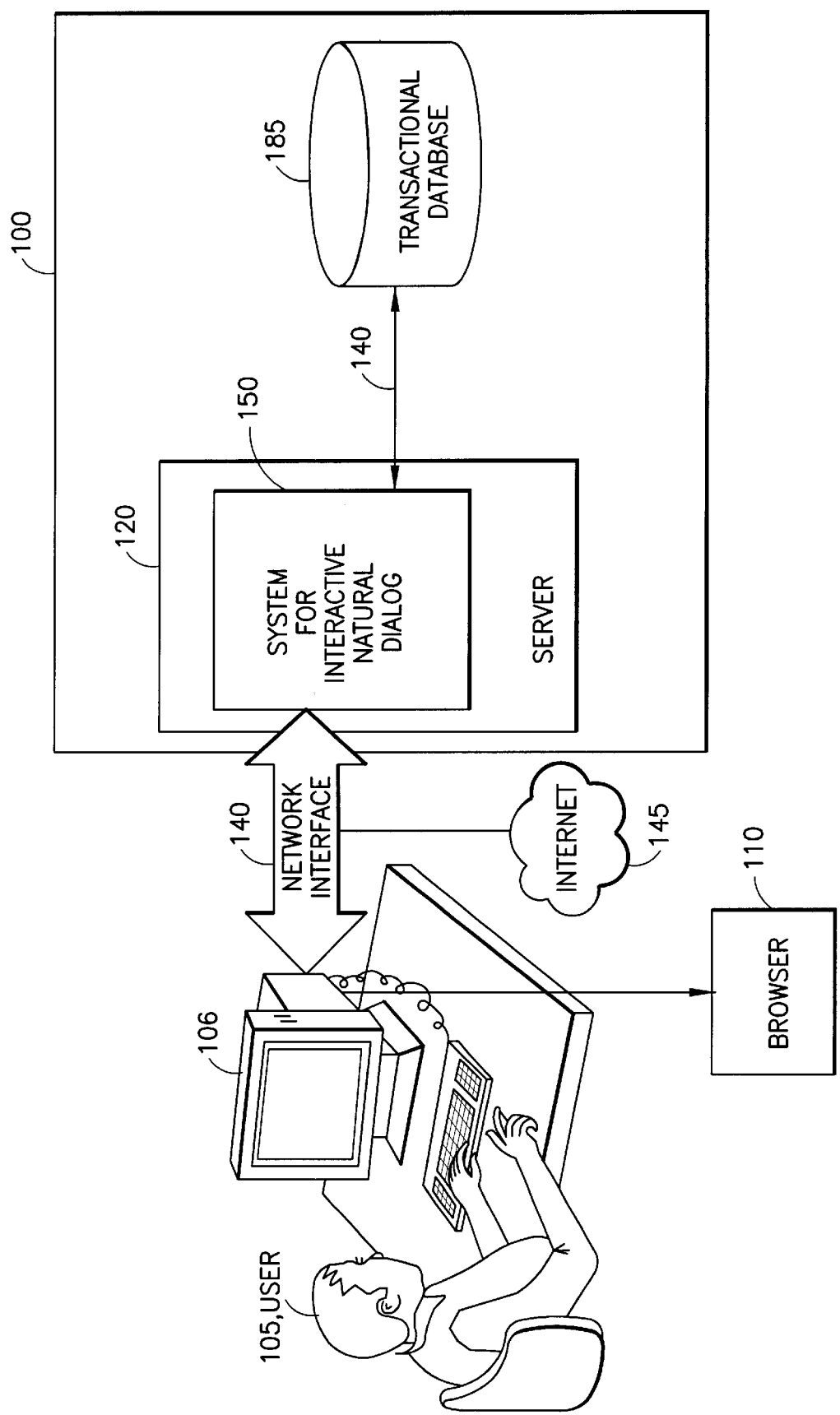
FIG. 1 shows a user interacting with an e-commerce site using an interactive natural dialog system.

FIG. 1 shows a high level diagram of the environment 100 of a preferred embodiment of the invention 150. The system for interactive dialog 150 (the system), residing on a server 120, is connected through network interfaces 140 to a transactional database 185 and to a network, preferably the Internet 145. The users 105 would access the system 150 using a (Internet) browser 110 running on a computer 106. In a typical scenario, the invention would be used by an e-commerce site. The browser 110 accesses the system 150 by initiating a session with the e-commerce site. Such a session is maintained by a network interface 140 connecting to one or more of the following: the Internet 145, an intranet, a local area network, a public service telephone network, a wireless cellular network, a cable network, a satellite communications network or any other private or public digital or analog data network.

FIG. 2 shows a high level block diagram of the interactive dialog system 150 (the system). The system receives input 205 from the user 105 through the network interface 140. Typical user input 105 might include typed or spoken requests in natural language for information about specific items or requests to process transactions; e.g. a typed request "show me all blue trousers without pleats". The presentation manager 215 in the system 150 is responsible for handling all interactions with the user. The presentation manager sends the user input 205 to a parsing engine 210—for different types of parsing see, G. Gazdar and C. Mellish, Natural Language Processing in Prolog, Addison-Wesley Pub. Co., GT. Britain, 1989. or James Allen "Natural Language Understanding" 1995, Addison-Wesley Pub Co.; ISBN: 0805303340. The choice of parsing method and static and dynamic parameters of parsing, such as types of grammar, depth, etc. can depend on other parameters of the system such as the taxonomical mapping, a business model, an information retrieval performance, an information retrieval confidence, actions of the presentation manager, actions of the dialog manager, and actions of the action manager.

The parsing engine 210 in turn parses the sentence and returns the parsed input (logical form) 212 to the presentation manager. The parsed input has a grammatical and structural organization. The parsed input 212 comprises a semantic interpretation of the user's request. For example, the request 205 "blue trousers without pleats" can be parsed into the logical form structure 212 ((noun: trousers) (modifiers (color blue)(property (neg (noun pleats))))). After receiving the parsed input 212 from the parsing engine 210, the presentation manager 215 sends the parsed input 212 to the dialog manager 220 for interpreting the user's input in the context of the present conversation.

The dialog manager 220 maintains the state of the current conversation in its internal memory and is responsible for controlling the entire interaction with the user through the presentation manager 215. Upon receiving any new parsed user input 212 from the presentation manager, the dialog manager 220 sends the parsed user input 212 to a taxonomical mapping process 250 to determine the exact business product category or categories asked for.

The taxonomical mapping process 250 receives the parsed user input 212 from the dialog manager and issues a query 243 based on the parsed user input 212 to the content database 270 containing an organization specific tabular mapping between category names and the business categories (for instance "trousers" may be mapped to "pants"). The results of the query 242 are sent back to the taxonomical mapping process 250 which then sends concepts and relations list 252 to the action manager 230. Thus the example parsed output 212 ((noun: trousers)(modifiers (color blue) (property (neg (noun pleats)))) can be converted into 252 ((product: pants)(modifiers (color blue) (negative pleats))).

The dialog manager 220 receives the concepts and relations list 252 from the taxonomical mapping process 250. Using the concepts and relations list 252, the dialog manager updates its internal state information and determines if further clarification is needed from the user before fetching items/information from the database. For instance, for a stock trading application, when the user 105 is requesting to buy a stock, the dialog manager 220 first checks the parsed user input 212 and its internal state information to see if all the parameters of the buy operation have been specified by the user. If some clarification is required from the user, the dialog manager 220 sends a presentation request 226 to the presentation manager 215 to ask the user 105 for clarifications about his/her request. FIG. 2(a) shows an example of a presentation request 226 for a clarification dialog with the user that results in the screen (system response 206) in FIG. 9(b) being shown to the user.

If all the parameters of the request have been identified, the dialog manager 220 sends an action request 222 to the action manager 230 to process the information/transactional request. For instance, the action request 222 might be a message requesting the action manager 230 to execute a stock "buy" transaction ("buy IBM shares 150 limit 104 valid today") or a request to retrieve all items of the type "pants (color blue) (pleats no)". The dialog manager then waits to receive action results 224 from the action manager and sends appropriate presentation requests 226 to the presentation manager 215 to present the system response 206 to the user's 105 original query. FIG. 2(b) shows an example of such a presentation request 226 sent to the presentation manager 215 that contains the system responses to a user's query. This presentation request 226 results in the results screen (system response 206) shown in FIG. 9(c) being shown to the user.

The action manager 230 is responsible for receiving action requests 222 from the dialog manager 220, processing them (i.e. Execute the transactions or retrieve the information), and returning action results 224 (containing the results of the action) to the dialog manager. An example of an action request 222 (a news request, in a stock buying application) is:

```
<ACTION_REQUEST>
    <USER_INPUT>any news on Cisco today?</USER_INPUT>
    <PARSED_INPUT>((action news)(stock cisco))</
    PARSED_INPUT>
    <REQUEST>
    <COMPANY_NEWS TIME="TODAY"
            SYMBOL="CSCO">
    </COMPANY_NEWS>
    </REQUEST>
</ACTION_REQUEST>
```

The above action request from the dialog manager 220 results in the following action result 224 message being sent to the dialog manager from the action manager 230:

```
<ACTION_RESULT>
    <COMPANY_NEWS>
        <TIME DAY="5" MONTH="October"
            HOUR="4:48PM"/>
        <COMPANY SYMBOL="CSCO" CHANGE="-7 7/16"
                PRICE="48 5/16" VOLUME="1,200,000">
            <LRR> Shares of Cisco Systems Inc. (CSCO) plummeted
                7-7/16 to close at 48-5/16 after the company
                confirmed that the FTC is investigating the
                company.
            </LRR>
        </COMPANY>
    </COMPANY_NEWS>
</ACTION_RESULT>
```

After receiving an action request from the dialog manager, the action manager formulates network actions 232 (e.g. an SQL query to a transactional database, a query to an information retrieval engine etc.) that are sent over the network interface 140 (e.g. The internet, a LAN, ethernet connection, remote dialup connection, etc.) and obtains network actions 232 in reply that contain the results of the action. The results 252 and 232 are sent by the action manager 230 in the form of action results 224 to the dialog manager 220 for presentation to the user. In the examples of the action request and action result shown above, the action request 222 from the dialog manager 220 is routed by the action manager 230 and to other systems 260, other transactional systems 175. The action result 224 that the action manager 230 sends back to the dialog manager 220 is a reformulated version of the output of the other systems (175, 260).

When the user 105 inputs a clarification to his/her request or inputs another request, the process described above is repeated.

As shown in FIG. 2AA, business rules/logic 2150, 2200, 2500, are used in several modules. First, in possibly adding contextual information to user input, e.g. in dialog manager 220. requesting a more expensive set of merchandise to be displayed to more affluent users. Second, in deciding how data/answers will be presented to the user, in presentation manager 215, e.g. showing promotional items more prominently. Third, in the taxonomical mapping process 250, in deciding which responses from the database should be presented, e.g. no mentioning of plastic earrings if the query comes after visiting jewelry web page. Also, business rules apply to query mapping into a concept and relationship list, in 250, e.g. "cheap computer" means "cheaper than $1200 on every day except Monday when it means cheaper than $1000". The above possibilities apply to both final and partial answers, as well as request for elaboration.

FIG. 3 shows two examples of tables stored in the retail content organization 270: Table 315 and Table 355, where Table 315 shows the content organization of a computer retailer and Table 355 shows the content organization of a clothing retailer. In the preferred embodiment, the content organization includes any one or more of the following: a taxonomy of a web site (hierarchically structured grouping of Web pages), a business model organization, a taxonomy of products (hierarchically structured grouping of products), a taxonomy of services (hierarchically structured grouping of services), one or more product categories, one or more service categories, a product list, a service list. In the preferred embodiment, the content organization structure is in the form of a tree (however other organizations, e.g. directed acyclic graphs, or associative memories could also be used). This tree is stored in the computer's memory in the form of a table, as in the content database 270 of FIG. 2. In a preferred embodiment, the tables have two columns. The first column represents the positions of nodes in the tree. The index a1 ... an-1 an gives the path of a node in the tree. a1 is always 0, which refers to the root of the tree. a1 a2 refers the node that is the a2'th node from left to right on the second level of the tree. The position of a1 ... an-1 an can be inferred similarly. The value of the content part gives the value of the node.

In the preferred embodiment, the content database 270 contains one or more of the following: service information, product information, retail information, wholesale information, one or more product images, text, voice or video information.

FIG. 4 shows two examples of tables stored in the normalization database 290. These tables associate natural language expressions with their normalized representations. This database is used by the taxonomical mapping process 250 to obtain the normalized logical form 213 of the parsed user input 212. Table 415 shows an example of normalized expressions based on classifying words based on linguistic knowledge (synonymy and hyponymy); table 417 uses normalization based on the knowledge of the domain. The two methods can also be used in combination. All of it is prior art.

FIG. 5(a) shows a high level diagram of the taxonomical mapping process 250. The taxonomical mapping process 250 receives the parsed user input 212 from the action manager and converts it into a tabular representation. FIG. 5(b) shows examples of tabular representations of parsed user input 212. Table 500 shows the tabular representation of the parsed user input 212 of the user query 205: "I want to buy trousers for my girlfriend". The table is a tree of the parsing result. The meaning of the index and the content is exactly the same as the description of Table 315 and Table 355 in FIG. 3. Table 555 shows the tabular representation of the parsed user input 212, for the natural language query: "I want to buy a small computer that can be easily carried for my sister in junior high" in the computer storage in the form of a table.

Referring to FIG. 5(a), the tabular representation of the parsed user input 212 is used by step 511 to formulate the normalization query 217. This normalization query can be the same as the parsed used input 212, or it might specify additional information, e.g. formatting information (prior art). In step 521, the normalization database 290 is queried using the query 217 which results in the normalized logical form 213 of the normalization query 217 (and therefore of 212). —The examples of such normalized logical forms for the above two queries are presented as 501 and 556 in FIG. 5(c).

The next step, 531, uses 217 to formulate a content query 243 against the content database 270. As above, this query 243 can be the same as 217, or might specify additional information, e.g. formatting information (prior art). The result of querying 270 in step 541 are presented as organization information 242, which in turn is used in step 551 to build 252 concepts and relationship list, representing the content and organization of the database 270. As before, in the preferred embodiment 252 might be the same as 242.

FIG. 6 describes step 541. In this step, content queries 243(a) and 243(b) are matched using rules 573 and 575 (respectively). These rules describe how structured queries such as 243(a)(b) should be matched with the structure of content. For example, rule 575 says that a thinkpad of choice for a nonprofessional person should be either model 570 or 390. In the preferred embodiment, these rules are part of content organization 270. However they could also reside on a separate database. Such rules are prior art. The result of matching the rule (or rules) is the required organization information 242, i.e. the classification of parsed user input 212 in terms of the business taxonomy 270 (content organization).

After executing steps 541 and 551 as described above, the taxonomical mapping process 250 sends the concepts and relations list 252 to the dialog manager 220 as described earlier.

The dialog manager 220 maintains the context of interaction (the session context) between the each of the users and the computer system; the context comprising one or more of the following: a session memory, a transaction history (history of transactions done by user, like a request to pay a bill in a banking domain), a presentation history (history of way the response has been presented to the user by presentation manager), an abstracted session memory, a discourse model (a module for discourse analysis), dialog planner (a module which decides what the dialog with the user should look like), a list of goals, a list of user intentions, a list of subdialogs, and a business logic governing the interaction (cf. Allen 1995, for definition of all these terms). The dialog manager allows users to recover from errors during the interaction, based on the session context.

FIG. 7 shows a flow chart of the dialog manager process 220. In step 805, the dialog manager receives the parsed user input 212 from the presentation manager 215. The dialog manager then sends the parsed user input 212 to the taxonomical mapping process 250 and receives the concepts and relations list 252 in reply. In step 810, the concepts and relations list 252 is compared against a fixed set of application specific action templates 806 and the matching templates are chosen. In the preferred embodiment, this matching is performed by using pre-defined rules and a matching criterion against pre-defined templates. In other embodiments, a standard supervised machine learning algorithm e.g. neural networks (well known prior art) can be used to learn the matching rules automatically from a corpus of labeled (enhanced logical form, filled template) pairs.

The dialog manager supports automatic generation of follow-up questions based on one or more of the following: the discourse, presentation history and domain lexicon (terminology used in the domain). The dialog manager also supports two or more users engaged in simultaneous interaction with the system 150, where the users are in synchronous collaboration (PRIOR ART; as in e.g. "COLLAGEN: *A Collaboration Manager for Software Interface Agents*", by Charles Rich and Candance L. Sidner, *User Modeling and User-Adapted Interaction, Special Issue on Computational Models for Mixed Initiative Interaction*, March 1998, incorporated here in its entirety) with each other and with the computer system by sharing the same session or sharing parts of their respective sessions.

FIG. 8 shows an action template 806 for buying retail items. The concepts and relations list 252 is matched against this template (and all other application templates 806) to determine the instantiations of slot 807 values. For example, the template in FIG. 8 is instantiated if the values of slots 807 "item name", "quantity", "model" and "transaction" are instantiated with appropriate values. Thus, a "buy" template is a valid match only if the value of the slot "transaction" is "buy".

Referring to step 815 in FIG. 7, after the matching templates 806 are chosen, the dialog manager 220 process determines the slots 807 whose values remain uninstantiated. The dialog manager performs discourse analysis (as in e.g. Allen 1995), which means looking at the discourse history of the current user session, the history of the user interactions in previous sessions, and the preferences of the user to determine if any of the missing slot 807 values can be inferred from context. e.g. the company name for buying a stock might be inferred from the context of the natural language conversation with the machine. In the above example, the value of the attribute "size" can be inferred from the long term history of interactions with the current user and the value of the attribute "color" may be inferred from the conversational history of current session (e.g. the user might say "show me blue shirts" and "I would like to buy two of these", where in the second sentence, the user really means "I would like to buy two of these blue shirts"). After filling slot values based on context (if possible), in step 820, the dialog manager chooses the best template 806 from among the matched templates based on some best choice criteria. Examples of such criteria include choosing the template with most slots filled, choosing the template with the most number of required slots filled, and choosing the template closest (semantically) with most recent template. If multiple templates remain even after applying the criteria, the dialog manager sends a presentation request 226 to the presentation manager 215 to ask the user to disambiguate his/her query.

Suppose the user input 205 was "I want to buy one 30 inch wide White Color Cooktop with Electric PowerSource and with Electric:Radiant Glass CookTop Surface and of Ken-More company" followed by another request "I want to buy one Black CookTop of previous type" Before taking discourse context into consideration, the following slots 807 in matching templates 806 with "buy" transaction are filled.
First Template (Used for Pants and Shirts):
TRANSACTION: buy
TEMPLATE SLOTS:
item name: CookTop
sku:
quantity: 1
size:
color: Black
company:
REQUIRED SLOTS: item name, quantity, company
Second Template:
TRANSACTION: buy
TEMPLATE SLOTS:
item name: CookTop Power Source:
Cooktop Surface:
Venting:
sku:
quantity: 1
size:
color: Black
company:
REQUIRED SLOTS: item name, quantity, company
After using the discourse context and filling the remaining slots 807, the templates will look like this
First Template (Used for Pants and Shirts):
TRANSACTION: buy
TEMPLATE SLOTS (i.e., PARAMETERS):
item name: CookTop
sku:
quantity: 1
size: 30 inch
color: Black
company: Kenmore REQUIRED SLOTS: item name, quantity, company
Second Template:
TRANSACTION: buy
TEMPLATE SLOTS:
item name: CookTop
Power Source: Electric
Cooktop Surface: Electric: Radiant Glass
Venting:
sku:
quantity: 1
size: 30 inch
color: Black
company: Kenmore
REQUIRED SLOTS: item name, quantity, company Both the templates 806 have all the required slots 807 filled after the discourse context is taken into consideration but since the second template has more parameters filled, the second template is chosen as the best matching template in the preferred implementation.

In step 825 of FIG. 7, the chosen best matching template is examined to see if all its required slots have been instantiated. If some of the required slots are missing, a presentation request 226 is sent (Step 830) to the Presentation Manager 215 to ask the user for the missing information. After all the required slots are filled, the completely instantiated action template 806 is sent (Step 840) to the to Action Manager 230. The dialog manager 220 then receives an action result message 224 from the action manager (step 850) and sends the same (step 860) as a presentation request 226 to the presentation manager 215 for display to the user as system response 206.

FIG. 9 shows the control flow of the presentation manager 215. The presentation manager is responsible for obtaining any input from the user 205 and for displaying the system's response 206 to the user. The idea of separating presentation from content is in the prior art. However, the integration of different modalities and channels is new. In step 905, a welcome display 945 for the user's specific channel is rendered. In the case of Web interaction, a welcome screen 945 is displayed (an example is shown in FIG. 9(a)). In step 910, the presentation manager 215 receives user's input 205 through one or more modalities of interaction (e.g. Keyboard input, keyboard output, speech input over a telephone, speech output over a telephone, speech input through a microphone, speech output over speakers, mouse input, a pointing device input, a dataglove, a device for translating signals into digital data, etc.). For example, in the Web interaction, users can use different modalities that include mouse clicks, screen touches, text input and so on. In step 915, the presentation manager pre-processes the user input 205 (e.g. run speech recognition), sends it to the parsing engine 210 and obtains the parsed user input 212 (which is independent of modalities and channels) from the parsing engine. For instance, if the user input is spoken, the presentation manager 215 is responsible for executing a speech recognition process to obtain a textual representation of the user's utterance. Then the presentation manager employs a natural language parser 210 and semantic classification to convert the textual input into parsed user input 212 that is sent to the dialog manager (Step 920).

The presentation manager 215 is also responsible for obtaining presentation requests 226 from the dialog manager 220 and presenting it to the user 105 as the system response 206 using appropriate channels and one or more modalities of interaction. In step 925 of FIG. 9, the presentation manager receives presentation requests 226 from the dialog manager. In step 930, the presentation manager constructs a specific display screen 950 by taking into account the bandwidth of the user's display device, limitations of the user's display device, personal preferences, and the modalities available for the user. For instance, if the user had spoken her request, the presentation manager 215 might decide to present the system's response 206 in an audio format by executing a "text-to-speech" process. The choice of the specific output format is based on the different parameters in step 930. Thus, the presentation manager 215 might display the system response 206 as a HTML table, as a textual description, as a spoken summary, etc. The user preferences might either be inferred by the system or explicitly stated by the user (through some mechanism for specifying preferences). Finally, in step 935, the presentation manager 215 renders the constructed display screen 950 to the user using available modalities over available channels. After displaying the system response, any user input 205 (e.g. a clarification or a correction or a new request) is again sent to the presentation manager 220 as described above. FIGS. 9(b) and 9(c) show examples of display screens 950 for a web channel for a clarification and results screen respectively.

FIG. 10 shows a block diagram of the action manager 230 module. The Action manager (AM) (230) maintains communication and transactions with one or more of the following systems: an information retrieval system, a knowledge base (database) of documents, a relational database, a directory of information (e.g.: A group of categorized URLs), an internet site, or any other computer system. The Action manager (AM) (230) is in charge of communication with back-end applications such as database managers. More specifically, it expects to receive through its DM interface (2300) an action request 222 from the Dialog Manager and channels it to one or more of its subordinate modules. To that effect, it looks up the type of action (2357) of the action request in the action dictionary (2350) by sending a query (2351) and receiving an answer (2352) and decides which module it should be routed to. Subordinate modules to the Action Manger include but are not limited to 2301 (transaction manager), 2302 (language reuse and regeneration (cf Dragomir R. Radev. Language Reuse and Regeneration: Generating Natural Language Summaries from Multiple On-Line Sources. PhD thesis, Department of Computer Science, Columbia University, New York, October 1998. included in it in its entirety), 2303 (database manager), and 2304 (information retrieval manager). The subordinate managers (2301–2305) communicate through one or more network interfaces (140) with external systems (175,260) and perform a number of network actions (232). The action manager 230 is responsible for obtaining the results of the subordinate managers and checking whether the request was successful. If yes, it may perform additional processing on the return message and route it back (2358) to the Dialog Manager. If no, it must notify the Dialog Manager 220 of the failure. This communication from the action manager to the dialog manager 220 is in the form of action results 224 messages.

The communication with the back end host is prior art (Client/Server Programming with Java and CORBA, Second Edition by Robert Orfali, Dan Harkey ISBN: 047124578X).

For completeness of the description of the preferred embodiment, we describe a possible implementation.

Operation of the Invention

In its preferred embodiment, the invention supplements Web sites by providing an interactive mechanism (a window or applet) to support natural language interactions with data stored in databases on the Web. In its preferred embodiment the interactions include transaction or information requests (including navigation, i.e.. getting the user to an appropriate web page or document), or any combination of the above. One main idea of the present invention lies in realization that the key to effective and fast interactions lies in providing support for both customers taxonomies (needed for natural language dialog) and business taxonomies (used e.g. for planning and reporting). The present invention provides such support by creating an association relation (or relations) between the two types of taxonomy. The user can specify an item or items and its parameters in natural language; the system responds showing appropriate pages (dynamically constructed) containing either the answer to the user query/request or a request to provide more information. The invention supports ungrammatical and misspelled queries in the natural language window. (The input can be typed there, but if speech recognition is available, the users could speak their queries). The system responses combine pictures, choice boxes and natural language. Parts of the system response can be given in recorded voice. The system can support personalization of output and input (e.g. sizes, age, color preference). The system can update the dialog automatically, e.g. by introducing sales items, and personalizing them based on the customer's data, the dialog so far, and merchant objectives. The system can support imprecise queries and requests, e.g. "I need a gift for my mom". How many questions can be supported is limited by the amount of descriptive information the merchants put in their database.

Recorded voice segments can be added to enhance the experience and direct customers attention. The following are typical scenarios:

Scenario 1: When the customer has specific items in mind, he/she would like to get the desired items quickly. The virtual agent tries to understand customers' special requests in NL and helps to find items efficiently without going through navigation. In addition, the virtual agent is able to answer specific questions customers might have in order to make decisions.

Scenario 2: When the customer only has some ideas but not quite specific, he/she would like to get some suggestions from the agent and also see more items to make a choice. The virtual agent figures out the customer's interests by asking questions related to the features of merchandises. Based on the responses, the virtual agent finds the items or information about classes of items.

Scenario 3: When the customer has multiple items in mind but not quite specific, he/she might want to see how those items match. The virtual agent first shows the matching items and then finds out customers' desired items by conversation.

Scenario 4: When the customer has a very general idea, such as "gift", he/she probably likes to get help from the virtual agent. The virtual agent takes the initiative by asking customers questions and lead customers to some category.

We elaborate Scenario 1: Find Request

User: I'm looking for a blue striped shirt and navy pants.
System: presents radio button selections for: men's, women's, boys', girls'.
User: selects men's
System: based on past buying history, presents a selection of Calvin Klein shirts and pants.
This screen allows user to select an item to see more details, buy it, or ask another question.
User: selects a pair of pants.
System: presents details for that pair of pants, box to buy it, and box to ask another question.
User: Do you have these in a lighter shade?
System: presents screen with additional pants. This screen allows user to select an item to see more details, buy it, or ask another question.
User: user selects a pair of pants and clicks to buy it and fills in size details.
System: screen shows that pants have been purchased. Shows boxes for: "show me the shirts again", and "show me some other shirts", "show me the matching jacket", and box to ask another question.
User: chooses matching jacket.
System: presents matching jacket details, box to buy it, and box to ask another question.
User: clicks to buy and fills in size details.
System: screen shows that jacket and pants have been purchased.

While the invention has been described in terms of preferred embodiments, those skilled in the art will recognize that the invention can be practiced with modification within the spirit and scope of the appended claims.

We claim:

1. A computer system with one or more memories, one or more central processing units (CPU), and one or more network interfaces, the system further comprising:

a content database stored on one or more of the memories, the content database having a content organization;

one or more presentation manager modules that present information from the computer system to one or more users over one or more of the network interfaces and accept queries from one or more of the users using one or more modalities over one or more of the network interfaces; a a parsing engine that parses one or more natural language phrases received over one or more of the network interfaces by one or more of the presentation managers, the natural language phrases being parsed into one or more logical forms, each logical form having a grammatical and structural organization;

a dialog manager module that maintains and directs interactive sessions between each of the users and the computer system by iteratively:

receiving logical forms from one or more of the presentation managers, performing a discourse analysis on these logical forms, selectively generating follow-up questions, said follow-up questions being presented to a respective user after each iteration until said dialog manager determines further clarification is unneeded, sending action requests to an action manager responsive to a determination that further clarification is unneeded, receiving action results from the action manager, and sending presentation requests to one or more of the presentation managers;

an action manager module that receives action requests from the dialog manager, performs the action, and sends the action results to the dialog manager, and a taxonomical mapping process that associates the logical forms of the natural language phrases to the content organization of the content database.

2. A computer system, as in claim 1, where the network interface connects to one or more of the following: the Internet, an intranet, a local area network, a public service telephone network, a wireless cellular network, a cable network, a satellite communications network, one or more other private digital data networks, one or more other public digital data networks, one or more other private analog data networks, and one or more other public analog data networks.

3. A computer system, as in claim 1, where the content organization includes any one or more of the following: a taxonomy of a web site, a business model organization, a taxonomy of products, a taxonomy of services, one or more product categories, one or more service categories, a product list, and a service list.

4. A computer system, as in claim 1, where the content database contains one or more of the following: service information, product information, retail information, wholesale information, one or more product images, text, voice information, and video information.

5. A computer system, as in claim 1, where the dialog manager maintains a session context between each of the users and the computer system, the session context comprising one or more of the following: a session memory, a transaction history, a presentation history, an abstracted session memory, a discourse model, dialog planner, a list of goals, a list of user intentions, a list of subdialogs, and a business logic governing the interaction.

6. A computer system, as in claim 5, where the computer system allows one or more of the users to recover from errors during the interaction by using natural language or other modalities of interaction, based on the session context.

7. A computer system, as in claim 1, where each of the presentation managers is responsible for the presentation of all information communicated between the users and the computer system using one or more modalities of interaction, and guided by business logic governing presentation of information to the user.

8. A computer system, as in claim 7, where the modalities of interaction include one or more of the following: a keyboard input, a keyboard output, a speech input over a telephone, a speech output over a telephone, a speech input over a microphone, a speech output over a speaker, a mouse input, a pointing device input, a dataglove, and a device for translating signals into digital data.

9. A computer system, as in claim 1, where the action manager maintains communication and transactions with .one or more of the following systems: an information retrieval system, a knowledge base of documents, a relational database, a directory of information, an internet site, and one or more computer systems.

10. A computer system, as in claim 1, where the taxonomical mapping process creates one or more relations between the logical forms and the content organization by associating one or more elements of the logical forms with one or more elements of the content organization of the content database.

11. A computer system, as in claim 10, where the taxonomical mapping process is guided by zero or more business logic rules.

12. A computer system, as in claim 1, where the network interface is an internet browser over the world-wide-web and the dialog manager keeps track of both the short term and long term history of a user's interactions with the computer system, and the user can ask for information or assistance using one or more modalities of interaction in an interactive dialog with the computer system.

13. A computer system, as in claim 1, where the dialog between one or more of the users and the computer system is synchronous and real time.

14. A computer system, as in claim 1, where one or more of the users can ask questions in natural language using a user terminology to obtain information or execute transactions from a business.

15. A computer system, as in claim 1, where the computer system can transfer the natural language queries of one or more users to a human agent along with the history of the user interaction with the system so far and the computer system enabling the human agent to supervise the conversation and intervene if necessary.

16. A computer system, as in claim 1, where a depth of parsing of the parsing engine is adaptable, and can vary depending on one or more of the following: the taxonomical mapping, a business model, an information retrieval performance, an information retrieval confidence, and one or more actions of the presentation manager, one or more actions of the dialog manager, and one or more actions of the action manager.

17. A computer system, as in claim 16, where the parsing engine is optimized by one of the following: an automatic procedure and a manual intervention.

18. A computer system, as in claim 1, where two or more users are engaged in interaction with the computer system, and all of the users are in synchronous collaboration with each other and with the computer system by sharing the same session or sharing parts of their respective sessions.

19. computer system, as in claim 10, where the taxonomical mapping is represented as database tables.

20. A computer system, as in claim 19, where the said taxonomical mapping is represented as list of computer procedures, accessing sources of information outside of the computer system.

21. A computer system, as in claim 11, where the user can refer to pictures and content of a web page during interaction.

22. A computer system, as in claim 5, where the dialog manager supports automatic generation of said follow-up questions based one or more of the following: the session context and a domain lexicon.

23. A computer system, as in claim 22, where said follow-up questions can be generated to facilitate personalization capability.

24. A computer system, as in claim 9, where the action manger supports multimedia information retrieval by using one or more of the following to present or constrain the answers: the taxonomical mapping process, a knowledge of domain and customers, and the session context.

25. A computer system, as in claim 9, where the information retrieval is refined through the dialog based on one or more of the following: the taxonomical mapping process and session context.

26. A computer system, as in claim 9, where the communications among the presentation manager, the dialog manager and the action manager are achieved by a messaging format using one or more different transmission protocols.

27. A method executing on a computer system with one or more memories, one or more central processing units (CPU), and one or more network interfaces, the method comprising the steps of:

presenting information from the computer system to one or more users over one or more of the network interfaces and accepting queries from one or more of the users using one or more modalities over one or more of the network interfaces;

parsing one or more natural language phrases received over one or more of the network interfaces by one or more of the presentation managers, the natural language phrases being parsed into one or more logical forms, each logical form having a grammatical and structural organization;

maintaining and directing interactive sessions between each of the users and the computer system by iteratively:

receiving logical forms from one or more of the presentation managers, performing a discourse analysis on these logical forms, selectively generating follow-up questions, said follow-up questions being presented to a respective user after each iteration until said dialog manager determines further clarification is unneeded, sending action requests to an action manager responsive to a determination that further clarification is unneeded, receiving action results from the action manager, and sending presentation requests to one or more of the presentation managers;

receiving action requests from the dialog manager, performing the action, and sending the action results to the dialog manager; and associating the logical forms of the natural language phrases to a content organization of a content database stored in one or more of the memories.

28. A computer system with one or more memories, one or more central processing units (CPU), and one or more network interfaces, the computer system comprising:

means for presenting information from the computer system to one or more users over one or more of the network interfaces and accepting queries from one or more of the users using one or more modalities over one or more of the network interfaces;

means for parsing one or more natural language phrases received over one or more of the network interfaces by one or more of the presentation managers, the natural language phrases being parsed into one or more logical forms, each logical form having a grammatical and structural organization;

means for maintaining and directing interactive sessions between each of the users and the computer system by iteratively:

receiving logical forms from one or more of the presentation managers, performing a discourse analysis on these logical forms, selectively generating follow-up questions, said follow-up questions being presented to a respective user after each iteration until said dialog manager determines further clarification is unneeded, sending action requests to an action manager responsive to a determination that further clarification is unneeded, receiving action results from the action manager, and sending presentation requests to one or more of the presentation managers;

means for receiving action requests from the dialog manager, performing the action, and sending the action results to the dialog manager; and means for associating the logical forms of the natural language phrases to a content organization of a content database stored in one or more of the memories.

29. A computer program product for use on a computer system which causes the computer system to perform the steps of:

presenting information from the computer system to one or more users over one or more of the network interfaces and accepting queries from one or more of the users using one or more modalities over one or more of the network interfaces;

parsing one or more natural language phrases received over one or more of the network interfaces by one or more of the presentation managers, the natural language phrases being parsed into one or more logical forms, each logical form having a grammatical and structural organization;

maintaining and directing interactive sessions between each of the users and the computer system by iteratively:

receiving logical forms from one or more of the presentation managers, performing a discourse analysis on these logical forms, selectively generating follow-up questions, said follow-up questions being presented to a respective user after each iteration until said dialog manager determines further clarification is unneeded.

sending action requests to an action manager responsive to a determination that further clarification is unneeded, receiving action results from the action manager, and sending presentation requests to one or more of the presentation managers;

receiving action requests from the dialog manager, performing the action, and sending the action results to the dialog manager; and associating the logical forms of the natural language phrases to a content organization of a content database stored in one or more of the memories.

* * * * *